(12) United States Patent
Weickel et al.

(10) Patent No.: US 10,738,800 B2
(45) Date of Patent: Aug. 11, 2020

(54) COMBINATION MANIFOLD BLOCK, VALVE HOUSING AND SPOOL VALVE ASSEMBLY FOR A MANIFOLD BANK

(71) Applicant: Asco, L.P., Novi, MI (US)

(72) Inventors: Scott Allen Weickel, Highland, MI (US); Bradly Joe Atkin, Stockbridge, MI (US); Shane Michael Gransden, South Lyon, MI (US)

(73) Assignee: Asco, L.P., Novi, MI (US)

( * ) Notice: Subject to any disclaimer, the term of this patent is extended or adjusted under 35 U.S.C. 154(b) by 12 days.

(21) Appl. No.: 15/765,301

(22) PCT Filed: Oct. 2, 2015

(86) PCT No.: PCT/US2015/053635
§ 371 (c)(1),
(2) Date: Apr. 2, 2018

(87) PCT Pub. No.: WO2017/058238
PCT Pub. Date: Apr. 6, 2017

(65) Prior Publication Data
US 2018/0306212 A1    Oct. 25, 2018

(51) Int. Cl.
*F15B 13/08* (2006.01)
*F15B 13/04* (2006.01)
*B33Y 80/00* (2015.01)

(52) U.S. Cl.
CPC ...... *F15B 13/0821* (2013.01); *F15B 13/0402* (2013.01); *F15B 13/0817* (2013.01); *F15B 13/0839* (2013.01); *B33Y 80/00* (2014.12)

(58) Field of Classification Search
CPC .............. F15B 13/0821; F15B 13/0402; F15B 13/0839; F15B 13/0817
See application file for complete search history.

(56) References Cited

U.S. PATENT DOCUMENTS

| 2,646,820 | A | 7/1953 | McLeod |
| 3,559,687 | A | 2/1971 | Asian et al. |
| 3,719,199 | A | 3/1973 | Mentink et al. |
| 4,574,848 | A | 3/1986 | Bartzick et al. |
| 4,867,697 | A | 9/1989 | Borges |

(Continued)

FOREIGN PATENT DOCUMENTS

| CN | 1293329 A | 5/2001 |
| CN | 1542294 A | 11/2004 |

(Continued)

OTHER PUBLICATIONS

Extended European Search Report for EP Application No. EP15905617.5 dated May 3, 2019 (7 pages).

(Continued)

*Primary Examiner* — Kevin L Lee
(74) *Attorney, Agent, or Firm* — Reising Ethington P.C.

(57) ABSTRACT

A valve assembly has a valve housing with a hole therein. A valve spool is slidably received directly into the hole of the valve housing with no sleeves or seals interposed therebetween. Preferably, the valve housing and valve spool may be made from hardened stainless steel, preferably hardened 440C stainless steel. Preferably the manifold block has integrally formed manifold section and valve housing section.

15 Claims, 8 Drawing Sheets

(56) References Cited

U.S. PATENT DOCUMENTS

| | | | |
|---|---|---|---|
| 4,958,695 A * | 9/1990 | Uchida et al. ............ | B62D 6/00 137/625.29 |
| 4,979,530 A | 12/1990 | Breda | |
| 5,184,648 A | 2/1993 | Walter et al. | |
| 5,333,647 A * | 8/1994 | Fukano et al. ...... | F15B 13/0817 137/271 |
| 5,529,088 A | 6/1996 | Asou | |
| 5,749,562 A | 5/1998 | Moller et al. | |
| 5,819,788 A | 10/1998 | Liesenhoff et al. | |
| 5,879,816 A | 3/1999 | Mori et al. | |
| 6,164,323 A | 12/2000 | Smith et al. | |
| 6,213,153 B1 | 4/2001 | Hayashi et al. | |
| 6,257,277 B1 | 7/2001 | McGeachy | |
| 6,302,149 B1 | 10/2001 | Sato et al. | |
| 6,929,031 B2 | 8/2005 | Ford et al. | |
| 6,955,336 B2 | 10/2005 | Bircann et al. | |
| 7,216,843 B2 | 5/2007 | Fukano et al. | |
| 7,261,121 B2 | 8/2007 | Bordonaro et al. | |
| 7,328,720 B2 | 2/2008 | Miyazoe | |
| 7,467,640 B2 | 12/2008 | Bordonaro et al. | |
| 7,603,854 B2 | 10/2009 | Strong | |
| 7,623,940 B2 | 11/2009 | Huskamp et al. | |
| 8,210,147 B2 | 7/2012 | Cotton | |
| 8,287,256 B2 | 10/2012 | Shafer et al. | |
| 8,459,227 B2 | 6/2013 | Cotton | |
| 8,757,208 B2 | 6/2014 | Dornbach et al. | |
| 9,284,860 B2 | 3/2016 | Bittel et al. | |
| 2001/0050348 A1 | 12/2001 | McGeachy | |
| 2009/0301592 A1 | 12/2009 | Mueller | |
| 2011/0057140 A1 | 3/2011 | Tejada et al. | |
| 2013/0306179 A1 | 11/2013 | Godzik et al. | |
| 2014/0156053 A1 | 6/2014 | Andavi et al. | |
| 2016/0290368 A1 | 10/2016 | Collins | |

FOREIGN PATENT DOCUMENTS

| | | |
|---|---|---|
| CN | 1580620 A | 2/2005 |
| CN | 1884851 A | 12/2006 |
| DE | 29520962 U1 | 7/1996 |
| JP | 2012017839 A | 1/2012 |
| WO | WO2009118030 A1 | 10/2009 |
| WO | WO2014179039 A1 | 11/2014 |
| WO | WO2014199158 A1 | 12/2014 |

OTHER PUBLICATIONS

Chinese Office Action for Chinese Application No. 201580083453.8 dated Jun. 20, 2019 (15 pages).
English Translation of Chinese Office Action for Chinese Application No. 201580083453.8 dated Jun. 20, 2019 (23 pages).
Supplementary European Search Report for Application No. EP15905616.7 dated Jul. 24, 2019 (10 pages).
European Search Report; Applicant: Asco, L.P.; Application No. EP15905616.7; dated Apr. 24, 2019 (12 pages).
PCT International Search Report and Written Opinion, PCT Application No. PCT/US2015/053632, dated Oct. 2, 2015, 16 Pages.
PCT International Search Report and Written Opinion, PCT Application No. PCT/US2015/053635, dated Oct. 2, 2015, 16 Pages.

* cited by examiner

COMBINATION MANIFOLD BLOCK, VALVE HOUSING AND SPOOL VALVE ASSEMBLY FOR A MANIFOLD BANK

TECHNICAL FIELD

The field of this invention relates to an additive manufacturing method for making a combination manifold housing, valve housing and valve spool for a manifold bank.

BACKGROUND OF THE DISCLOSURE

Solenoid valve systems for controlling flow of hydraulic or pneumatic fluid have been used in automated manufacturing equipment, production lines and numerous industrial applications. A plurality of solenoid valve housings, often referred to as manifold valve housings, manifold valve bodies, valve housings, valve bodies or valve housings, typically are mounted on a manifold having a plurality of passages for supplying fluid to the valves and providing passages to various outlet ports of each valve. Each solenoid of each valve housing typically is connected to an electronic system that controls operation of the several solenoids and valves. A typical manifold may contain many valve housings. The parts in a typical valve housing include gaskets, sleeves, mounting bolts and fasteners for attachment to other valve housings.

In the past, multiple valve housings were often mounted on a single manifold housing. The main disadvantage of the single manifold housing was that it limited the number of valve housings that can be assembled together, i.e. there was no adaptability to make the manifold longer to house more valve housings.

As a consequence, modular manifolds were developed. This modular manifold includes manifold modules mounted adjacent one another. The number of manifold modules used was adjustable up to a desired number. Each manifold module has a valve housing mounted thereon with the appropriate fasteners and seals.

The valve element used in these solenoid valve housings is typically a valve spool. Valve spools for pneumatic valves typically function as an air bearing. The valve spool is made from hardened 440C stainless steel is slidably received in the valve hole of the sleeve. The valve spool is finished to slidably fit within a valve hole and to slide virtually frictionless by floating on a thin air cushion as it reciprocates within the valve hole. The precise fit of the valve spool in the valve holes provides for a valve with an acceptably low leakage rate. The air cushion also provides for a long lasting, durable, and fast acting valve.

The valve housing is commonly made from aluminum. Aluminum is often used because it can be easily cast. Hardened 440C stainless is less amenable for casting and would require expensive machining. As a consequence of the harder metal of the valve spool, the valve housing up to now has not been able to directly receive the valve spool therein, but needs an intermediate member, often referred to as a sleeve. If the valve spool is received directly in the valve hole of the valve body, galling takes place which degrades the function of the valve. Furthermore, any contaminates within the valve housing can scratch the wall surface of the valve hole upon sliding of the valve spool within the valve hole which also degrades the function of the valve.

The sleeve prevents or reduces galling and scratching. The sleeve is made of hardened 440C stainless steel and is fitted into the valve hole with elastomer seals separating the different galleries. The sleeve needs to be properly positioned for appropriate alignment of the respective ports of the sleeve and the valve housing to assure the valve spool properly works. The sleeve has gaskets, o-rings or other seals seated on its exterior wall properly positioned to assure that the different ports in the valve housing are selectively sealed from one another about the perimeter of the sleeve so that the valve properly functions. The hardened 440C stainless steel prevents galling and scratching between the sleeve and valve spool.

The valve housing and the sleeve both need to have a certain wall thickness to maintain structural integrity. This requirement for structural integrity adds width to each valve housing. This added width is more noticeable, i.e. accentuated for smaller more compact valve housings.

Other parts, namely fasteners, for example nuts and bolts are commonly used to assembly the individual valve housings together. Separate adapters in the form of fittings are also mounted onto each housing to be connected to various input and output lines. Fasteners are also needed to mount the valve housing onto the manifold module. The fasteners, sleeve, and seals between the valve spool, sleeve, valve housings, and manifold modules, however add complexity and cost in machining and assembly to the finished valve unit.

What is needed is a monolithic. i.e. integrally formed combination manifold and valve housing with a reduced number of parts needed for it to be operational and connectable to other combination manifold and valve housings. For example, what is needed is a valve spool assembly that directly slidably mounts a valve spool without the intermediate sleeve or seal members. What is also needed is a monolithic module or modular unit that includes both a manifold section and a valve section. The monolithic housing slidably mounts a valve spool and provides internal passages to internal cross passages that extend laterally across the manifold section. What is also needed is a combination manifold and valve housing that is able to be simply mounted to an adjacent manifold and valve housing preferably without the need for separate fasteners. What is also desirable is a combination manifold and valve housing preferably made of hardened 440C stainless steel that slidably receives a valve spool. What is also desired is a combination manifold and valve housing that is made by additive manufacturing to provide integrally formed inlet and outlet fittings and made from 440C stainless steel. What is also desired is a valve housing made by additive manufacturing with a hardened 440C stainless steel section about an internal hole that slidably mounts a valve spool.

SUMMARY OF THE DISCLOSURE

In accordance with one aspect of the invention, a valve assembly includes a valve housing with a valve hole therein. A valve spool is slidably received directly in the valve hole of the valve housing with no sleeves or seals interposed therebetween. The valve housing preferably is made by additive manufacturing with the valve hole formed during the additive manufacturing process. Preferably, the valve housing and valve spool are made from hardened stainless steel, preferably hardened 440C stainless steel. In one embodiment, the valve housing is made by additive manufacturing with a hardened stainless steel, e.g. 440C about the valve hole and a different material in the remainder of the valve housing. In one embodiment, the different material may be softer, e.g. aluminum, and in another embodiment, it may be harder, e.g. tungsten. In one embodiment, the valve housing is modular and constructed to mount together with a second valve housing.

In accordance with another aspect of the invention, a fluid control system has a manifold bank with a plurality of housings fastened to each other side-to-side. The housings each include at least two passages parallel to and offset from each other. Each housing has at least one outlet port for selectively being in communication with the first and second passages. Each housing has a valve section being integrally formed therewith that has a valve cavity. Internal ports are connected between the valve cavity and the passages. A valve spool is operably mounted in the valve cavity with no sleeves or seals interposed between the valve spool and the valve section for selectively opening the at least one outlet port to one of the first and second passages. An actuator is mounted on the manifold housing for slidingly operating the valve spool.

In accordance with another aspect of the invention, a combination modular housing for a valve manifold bank has a valve section and a manifold section integrally formed preferably by additive manufacturing. The housing has a first lateral side having a first connector and a second lateral side having a second connector that is interlockable with a first connector on an adjacent housing. At least one fluid passage preferably formed during the additive manufacturing extends from the first lateral side to the second lateral side to be alignable with at least one fluid passage of an adjacent housing. The valve section has a cavity formed preferably during the additive manufacturing and has a valve operably mounted therein.

Preferably, the first connector is a set of ribs and the second connector is a set of grooves that are interlockable with a set of ribs on an adjacent housing. Each of the ribs has distal edges facing away from each other and form a raised lateral surface section therebetween. Each of the grooves has distal edges facing toward each other and form a recess surface therebetween wherein the recess surface is slidably engageable with a raised lateral surface section of an adjacent housing. Each of the ribs has distal edges facing away from each other and angled with respect to each other at an included angle to form a wedge. Each of the grooves has distal edges facing toward each other and angled with respect to each other to form the same included angle to form a wedge shaped cavity therebetween wherein a wedge is slidably engageable with the wedge shaped cavity of another housing until the ribs lock within the groove to frictionally lock the housings together. Preferably, each of the ribs is canted inward toward each other at an included angle of less than 7° to form a self locking taper. Each of the grooves is canted toward each other at a same respective angle of less than 7° to form a self locking taper.

Preferably, the wedge has its greatest thickness in proximity to or at one of the bottom and top wall of the housing and tapered to the other of the bottom and top wall of the housing and forming a canted lateral side surface of the wedge. The wedge shaped cavity has its greatest depth in at one of the bottom and top wall of the housing and tapered toward the other of the bottom and top wall of the housing forming a canted lateral side surface of the wedge shaped cavity. The first lateral side surface of the wedge is slideably engageable to the lateral side surface of the wedge shaped cavity of another housing and is able to compress a sealing gasket positioned about the fluid passage interposed between the respective lateral side surfaces of the housings.

In one embodiment, the ribs and grooves are vertically extending to allow the housing to slidably engage and disengage in a vertical direction to and from a position within the manifold bank without disturbing other housings. The manifold housing has at least one laterally extending alignment pin hole for receiving an alignment pin for fixing the housing from vertically moving with respect to another housing when the alignment pin extends through the other housings.

In one embodiment, the valve spool is made from hardened stainless steel and the housing is made from additive manufacturing with a section about the valve hole being made from hardened stainless steel and a remainder of the valve housing being made from a softer material. Preferably, the hardened stainless steel is 440C stainless steel. In one embodiment, the valve housing has an integrally formed valve fitting made during the additive manufacturing.

According to another aspect of the invention, a combination modular housing for a manifold bank has a valve section formed by additive manufacturing with a valve cavity preferably formed during the additive manufacturing for receiving a valve therein. A manifold section is also preferably formed with the valve housing section by additive manufacturing. The manifold section includes at least one passage preferably formed during the additive manufacturing laterally extending between two side walls. The at least one passage is in fluid communication with the valve cavity via at least one internal path formed during the additive manufacturing extending between the valve cavity and the at least one passage.

Preferably, the at least one passage is a plurality of passages that are parallel and offset from each other and the at least one internal path is a plurality of internal paths. Preferably, the cavity is a valve hole that is cylindrically shaped and has a circular shape in cross-section. The valve hole is substantially perpendicular to the plurality of passages. The valve is a valve spool slidably installed in the valve hole of the valve section. Preferably, the valve section and the valve spool are made from hardened stainless steel.

In one embodiment, the plurality internal ports are transverse to both the valve hole and the plurality of passages. Preferably, an integrally formed valve fitting formed by additive manufacturing surrounds an outlet port preferably formed during additive manufacturing extending from the valve hole.

In accordance with another aspect of the invention, a housing preferably made by additive manufacturing for a valve manifold has a bore therein for directly mounting a valve spool therein with no sleeves or seals interposed therebetween. A first side and opposite second side is constructed to be interlocked together by friction without the use of separate fasteners. The housing is formed with an integrally formed fitting that is made by additive manufacturing and surrounds the outlet port.

BRIEF DESCRIPTION OF THE DRAWINGS

Reference now is made to the accompanying drawings in which.

DETAILED DESCRIPTION OF THE PREFERRED EMBODIMENT

Figure 1:
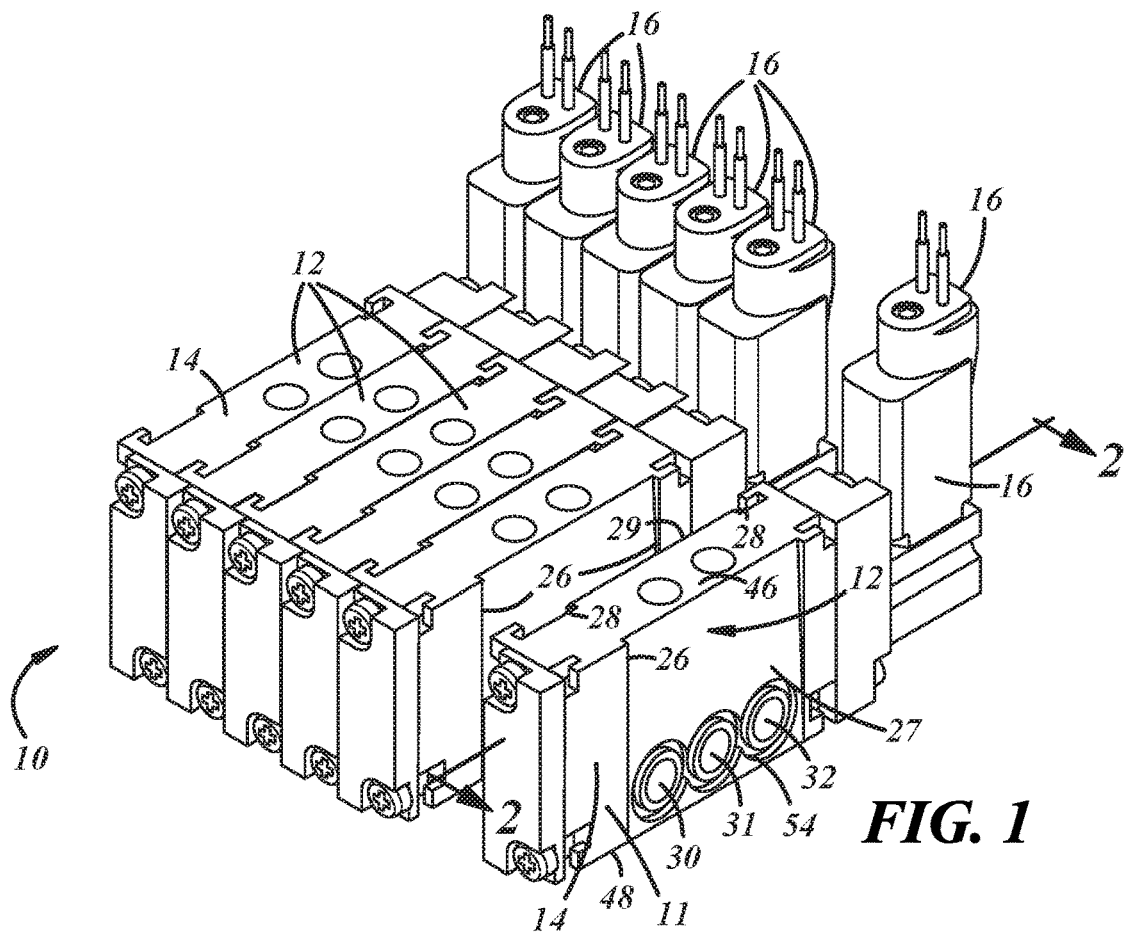
FIG. 1 is a perspective and fragmentary view of one embodiment of a manifold bank having a plurality of combination manifold housings and valve housings according to the invention.
Figure 2:
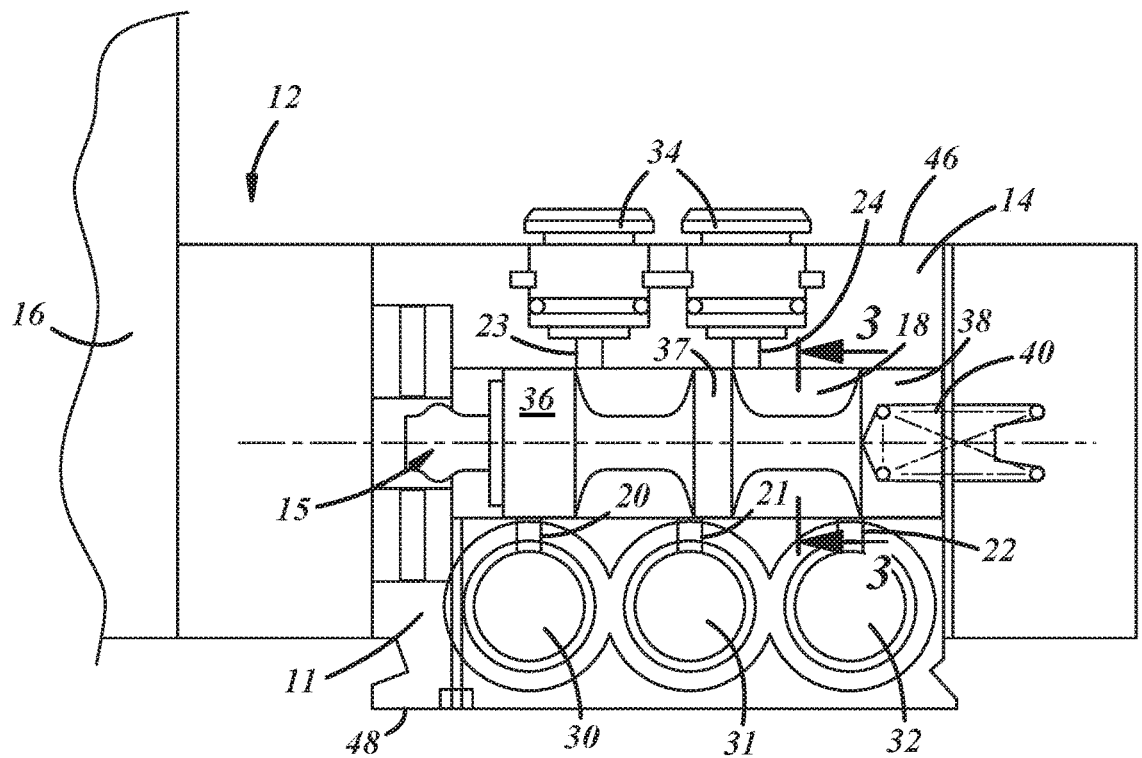
FIG. 2 is a side elevational and partially segmented view of one combination manifold housing and valve housing shown in FIG. 1 illustrating a valve spool mounted therein.
Figure 3:
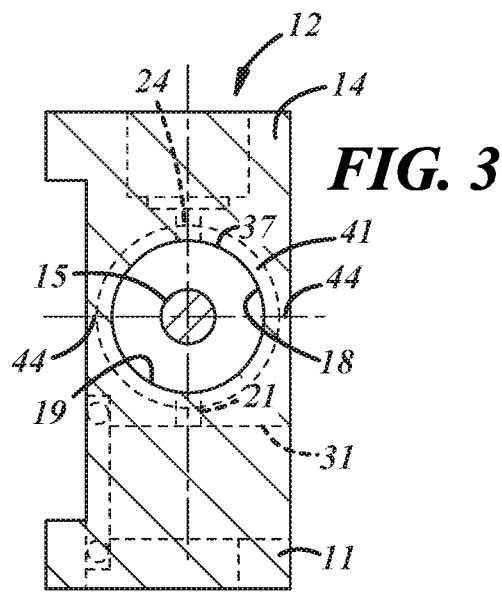
FIG. 3 is an end view of the combination manifold housing and valve housing illustrating the circular shape of the valve hole in cross-section.

Referring now to FIGS. 1-3, a manifold bank 10 includes a series of monolithic combination modular units, each referred to as a housing 12, connected to each other in facing engagement. Each housing 12 includes an integrally formed lower manifold section 11, and an upper valve section 14. The housing 12 is made by additive manufacturing to integrally form the manifold section 11 with the valve section 14, i.e. the housing is monolithic. A solenoid pilot valve 16 is mounted thereon for actuating a valve spool 15 slidably movable in the valve section 14. The housing 12 and valve spool 15 are made from a hardened stainless steel, for example hardened 440C stainless steel. The valve section 14 illustrated in FIGS. 1-3 represents a miniature valve e.g. less than a 10 mm in width valve housing. Connecting grooves 26 and ribs 28 are on respective lateral side walls 27 and 29 to connect adjacent housings 12.

As more clearly shown in FIGS. 2 and 3, the valve section 14 has a valve hole 18 therein that slidably receives valve spool 15. The valve hole 18, defined by its wall 19, is circular in cross section as shown in FIG. 3 and is generally cylindrical in shape as illustrated in FIG. 2. As shown in FIGS. 1, 2, and 3, three lateral passages 30, 31 and 32 in the manifold section extend laterally through each housing 12 from one lateral side wall 27 to the other lateral side wall 29 to form passages through the manifold bank 10 as a whole.

There are three internal paths 20, 21 and 22 in fluid communication axially spaced points along the valve hole 18 and intersect the valve hole 18 substantially transversely. The internal paths 20, 21, and 22 are in fluid communication with the three lateral passages 30, 31 and 32 and intersect them transversely. The valve hole 18 is also substantially transverse to the lateral passages 30, 31, and 32. Two external ports 23 and 24 extend upwardly from the valve hole 18 and are each fitted with a tube connector or fitting 34 at top wall 46. The fitting 34 may also be integrally formed with the housing 12.

The valve spool 15, as illustrated, is biased in one direction by a coil spring 40 and is movable in the opposing direction as a function of fluid pressure applied to the opposing end of the valve spool. The spring 40 may be replaced with a dual action solenoid valve. The fluid pressure is controlled by the solenoid valve 16 mounted at an associated end of the valve section 14.

The valve spool 15 has three lands 36, 37, and 38 with land 37 interposed between lands 36 and 38. In one position of the valve spool, port 21 is in communication with port 23 while port 24 is in communication with exhaust port 22. In another position of the valve spool, port 21 is in communication with path 24 while port 23 is in communication with exhaust path 20. The illustrated port arrangement is only one example of numerous possible port and land arrangements for the valve depending on the application.

The lands 36, 37 and 38 of valve spool 15 are sized both to slide freely within valve hole 18 and also to control fluid flow between paths 20, 21, and 22 and appropriate inlet port 21 to appropriate exit ports 23 and 24. The size of the valve spool provides an acceptably low leakage rate between the lands and the wall 19 of the valve hole 18. The lands are directly opposed and adjacent to the wall 19 without any intervening sleeve or gasket. To provide for the appropriate air bearing function between the valve spool 15 and housing, the valve spool 15 is lapped until it is of proper size and the valve hole 18 is also finished to the appropriate manufacturing tolerances.

In operation, the valve spool 15 slides between its two positions to selectively communicate valve ports 23 and 24 with inlet path 21 and exhaust paths 20 and 22. As best shown in FIG. 3, the thinnest section of wall section 44 of the valve section 14 is along a horizontal mid-line. By eliminating any intermediate sleeve, the housing 12 can be thinner compared to valve housings for sleeved valve spools of comparable flow ratings while still providing the same structural integrity at wall section 44.

By having both the valve section 14 (at least layer 41 thereof) and the valve spool 15 made from hardened 440C stainless steel, the valve spool can slidably mount directly in a valve hole of the valve section 14 without the need of an intermediary element, e.g., a sleeve. The hardened stainless steel is resistant to both galling and scratches from impurities to maintain a durable valve. While the above illustrated valve spool can be less than 10 mm in width, the sleeveless valve spool is not confined to a specific size.

Figure 4:
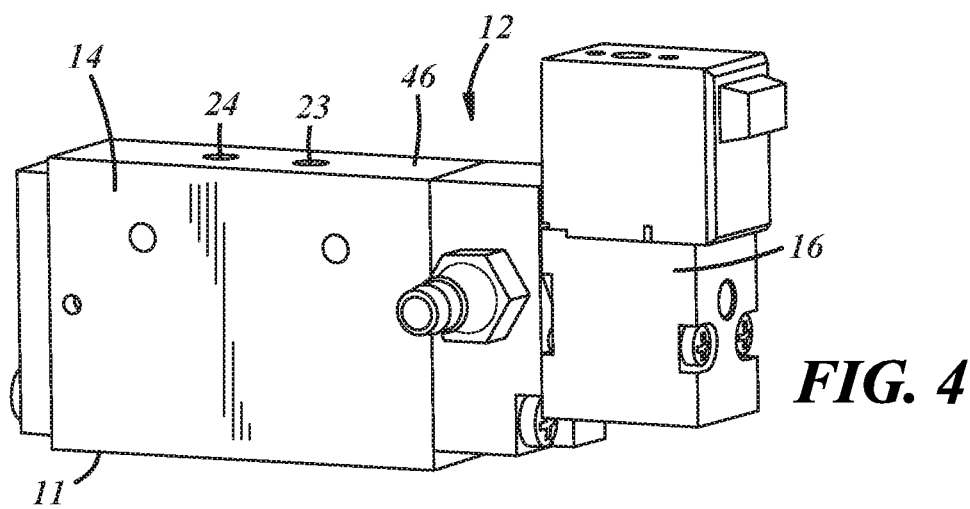
FIG. 4 is a view of an alternate embodiment illustrating a four-way valve housing in accordance with the invention.
Figure 5:
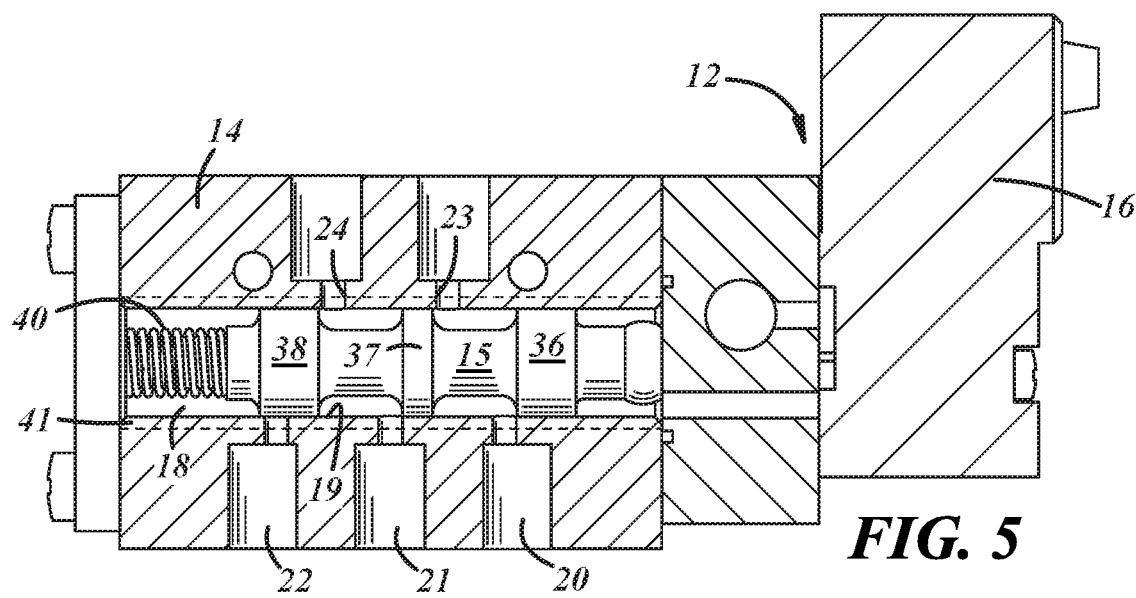
FIG. 5 is a side elevational and partially segmented view of the alternate embodiment shown in FIG. 4.
Figure 6:
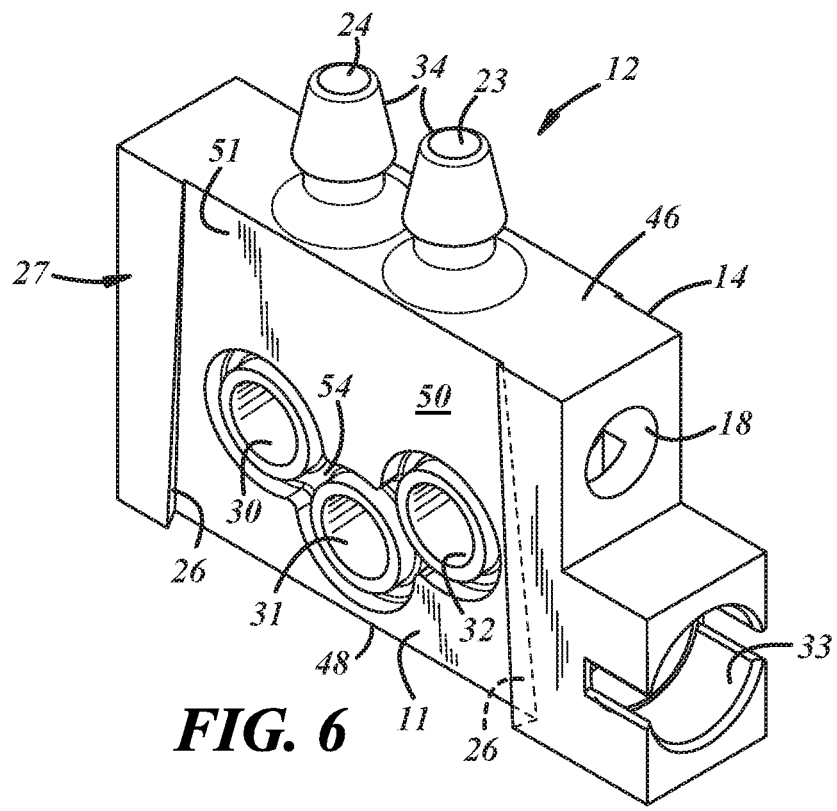
FIG. 6 is a front perspective view of an alternate embodiment in accordance with the invention.
Figure 7:
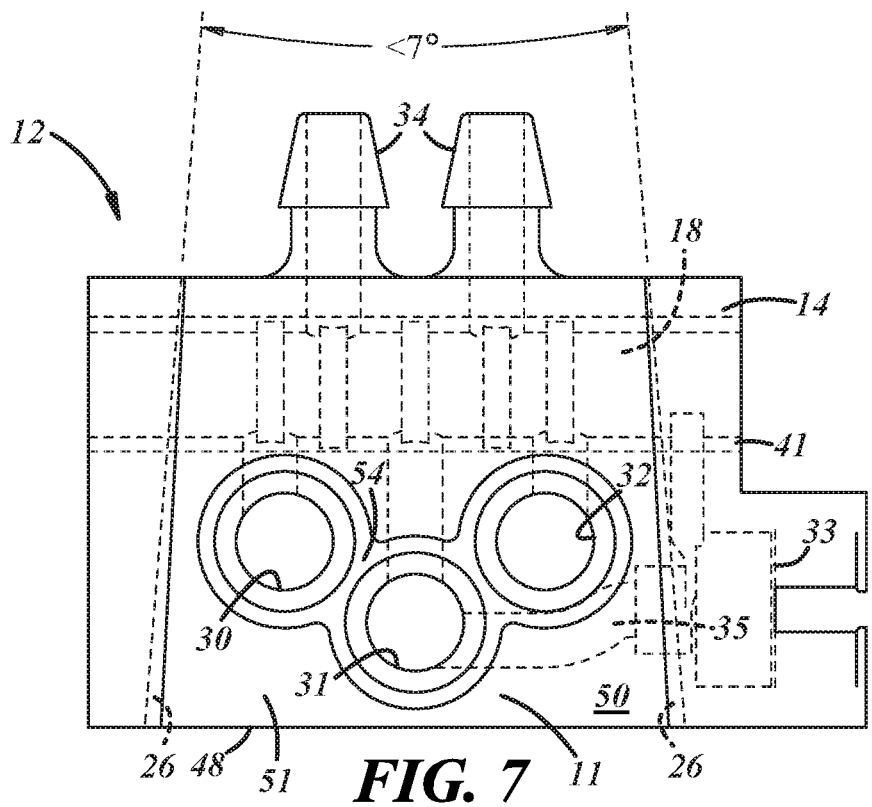
FIG. 7 is a front elevational view of the combination manifold housing and valve housing shown in FIG. 6.
Figure 8:
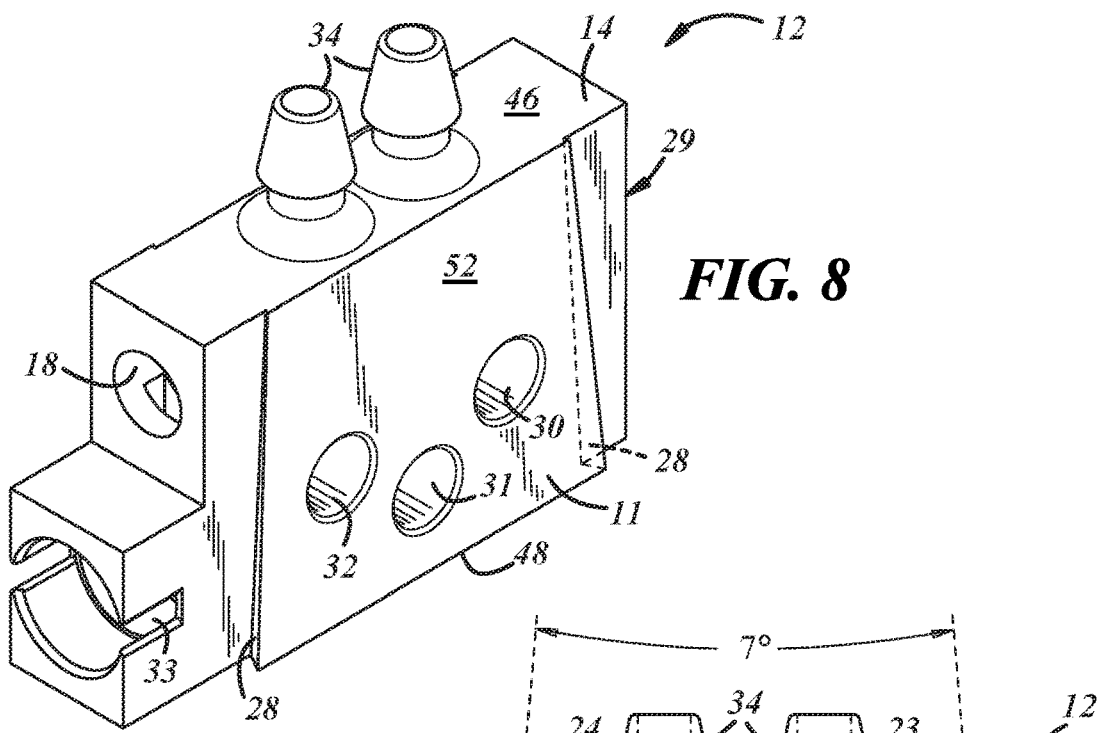
FIG. 8 is a rear perspective view illustrating the other lateral side of the combination manifold housing and valve housing shown in FIG. 6.
Figure 9:
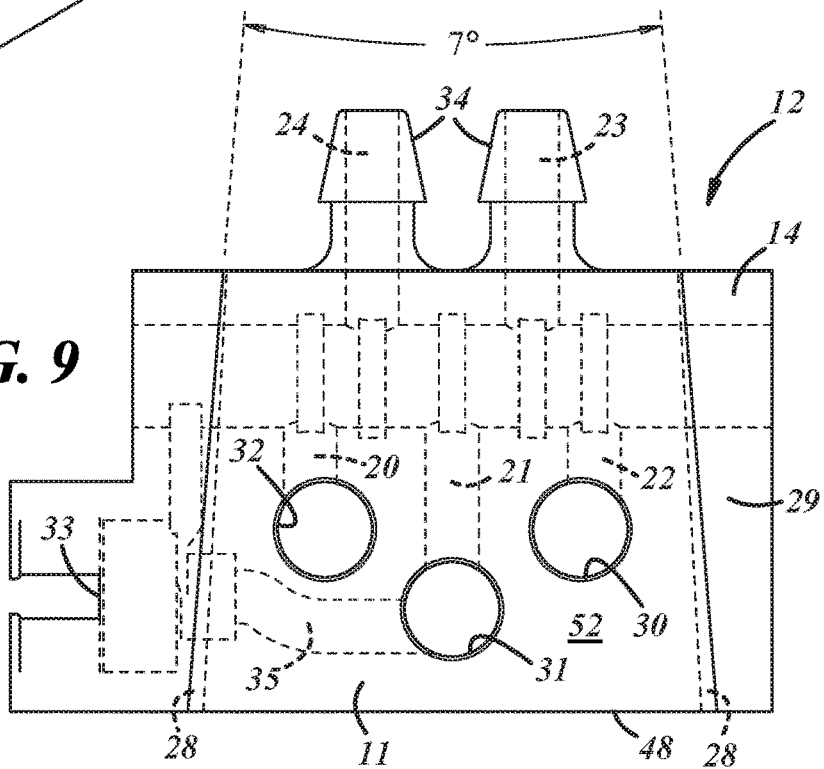
FIG. 9 is a rear elevational view of the combination manifold housing and valve housing shown in FIG. 8.
Figure 10:
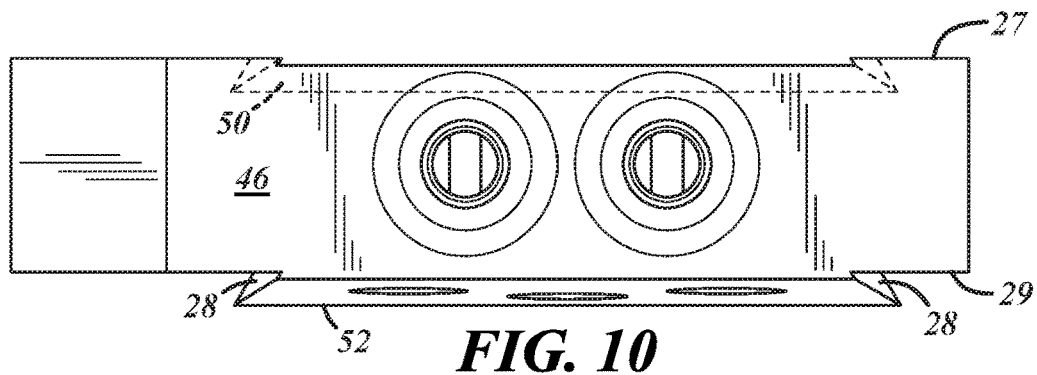
FIG. 10 is a top plan view of the combination manifold housing and valve housing shown in FIG. 6.

Another alternate embodiment of a sleeveless valve spool is shown in FIGS. 4 and 5 which illustrates a separate housing 12 with valve section 14, valve hole 18 and valve spool 15. Comparable parts are shown with the same numerals as the previously described embodiment. The paths 20, 21 and 22 are now external ports and extend downwardly to the bottom wall 48 of the valve section 14 to be conventionally mounted to a separate modular manifold module (not shown) or other fittings.

The four-way two position valves are shown as examples according to the invention. Other types of valve spools other than two position four-way valves are also possible for many different applications. While a spring loaded return valve is shown, the invention can also apply to a direct solenoid or a dual solenoid pilot actuated valve assembly where an actuator solenoid 16 or solenoid pilot is positioned at each end of the valve section 14. As with the first embodiment, this valve section 14 may be formed by additive manufacturing with the valve hole 18 being finished to proper specifications.

The housing 12 and valve section 14 are made from 440C stainless steel and preferably needs to be painted or undergo a passivation process to remove the free iron. A chromium oxide layer can be a preferred coating. This coating provides for durability and integrity of the surface of the valve section 14.

Figure 11:
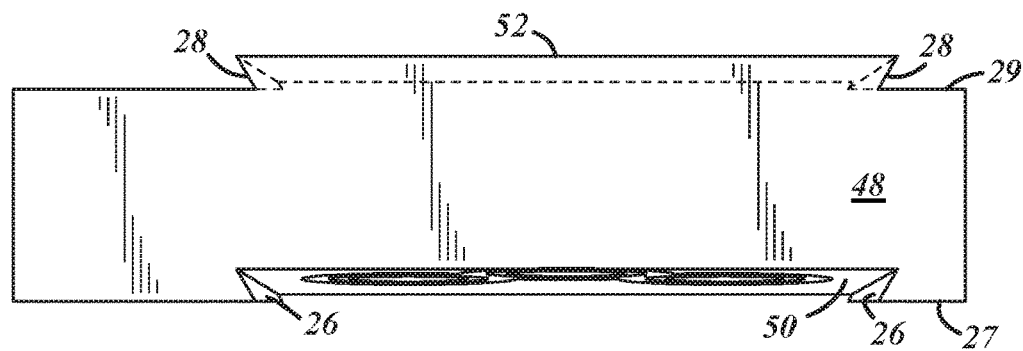
FIG. 11 is a bottom plan view of the combination manifold housing and valve housing shown in FIG. 6.

Referring now to FIGS. 6-13, additional fasteners may also be eliminated by use of integrally formed connectors, e.g. a wedge and fastenerless self locking connection between the plurality of housings 12. The connectors may include grooves 26 and complementarily shaped ribs 28 that connect two adjacent housings 12 together. Each groove 26 on front lateral side wall 27 faces the other and is tapered from the bottom wall 48 to the top wall 46. As shown in the drawings, the bottom wall 48 and the top wall 46, as labeled, are shown in the respective top and bottom position but the housing 12 can be positioned in any orientation when installed as the application dictates. The term "vertical" relates to the directional orientation between the top wall 46 and bottom wall 48 and is not dictated by orientation to the earth. Each groove 26 and rib 28 has its respective surfaces from an approximately 60° angle as shown in FIG. 11 for the preferred embodiment. Other angles are possible as long as they provide a suitable engagement between the ribs and grooves as described below.

A recess surface 50 is formed between the two facing ribs 26. The recess surface 51 has a slight recess cant for example, 1° from the remainder of the wall 27. The extending lateral passages 30, 31 and 32 are positioned near the bottom wall 48 at the deeper section of recess surface 50. Complementarily shaped ribs 28 extend from lateral wall 29 and are tapered from the bottom wall 48 to the top 46. A complementary canted male surface section 52 of lateral wall 29 is formed between the two spaced ribs 28. The lateral passages extend through the bottom thicker section of canted male surface section 52. The cant of the recess surface 50 and the male section 52 are complementary and can vary depending on the application. For example, if thicker gaskets 56 are used, the cant may be greater to provide greater clearance as needed. On the other hand, if flow rates require a larger diameter valve hole 18, then a lesser cant is desired to provide more usable housing width for providing sufficient structural integrity at wall section 44.

Figure 12:
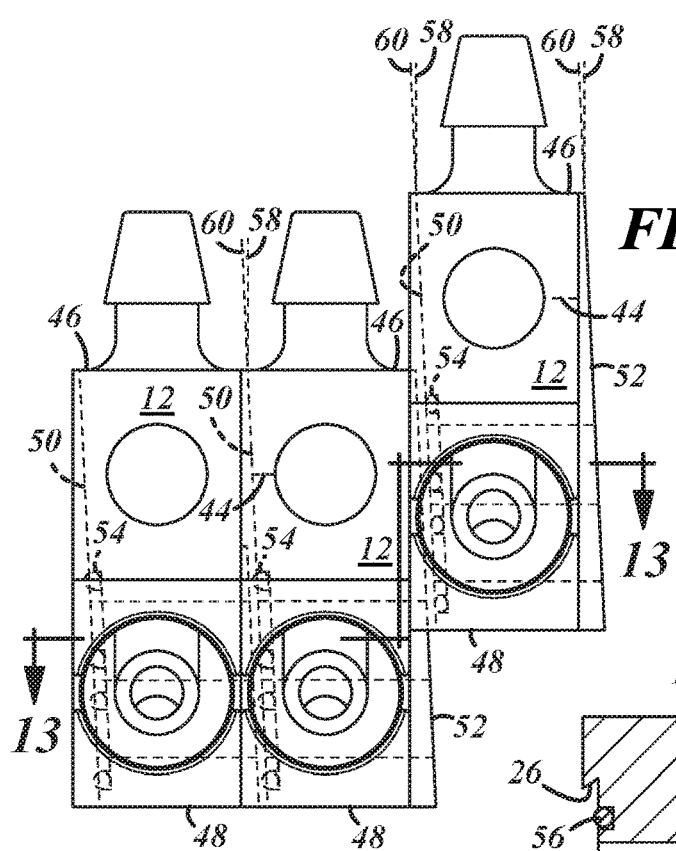
FIG. 12 is side elevational and schematic view illustrating the combination manifold housing and valve housings with one combination manifold housing and valve housing being partially installed.
Figure 13:
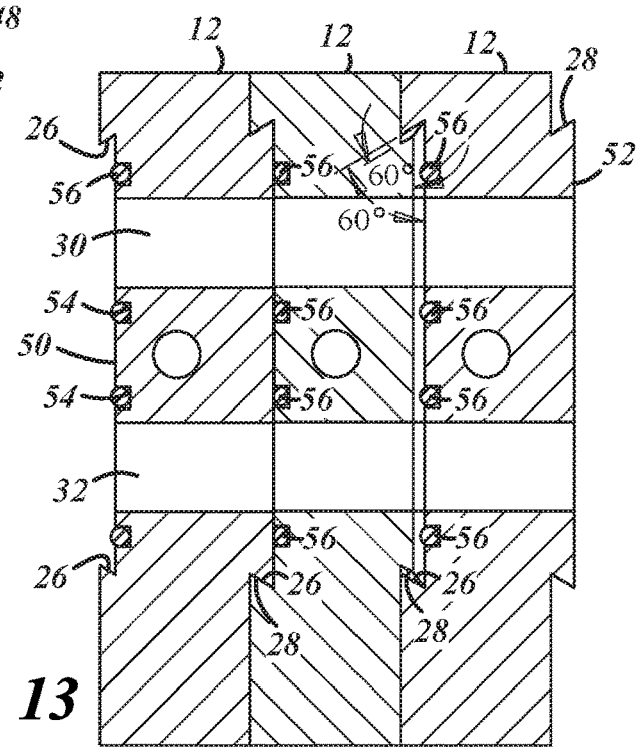
FIG. 13 is a cross-sectional view and schematic view taken along line 13-13 shown in FIG. 12.
Figure 14:
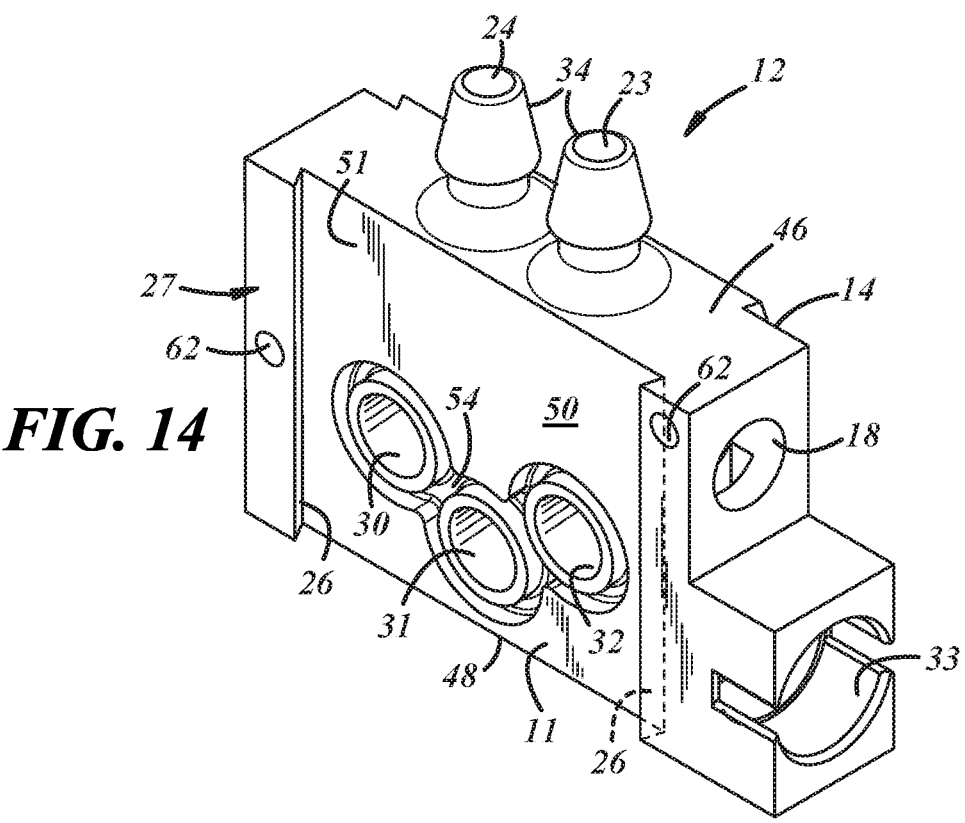
FIG. 14 is a front perspective view of a further embodiment in accordance with the invention.
Figure 15:
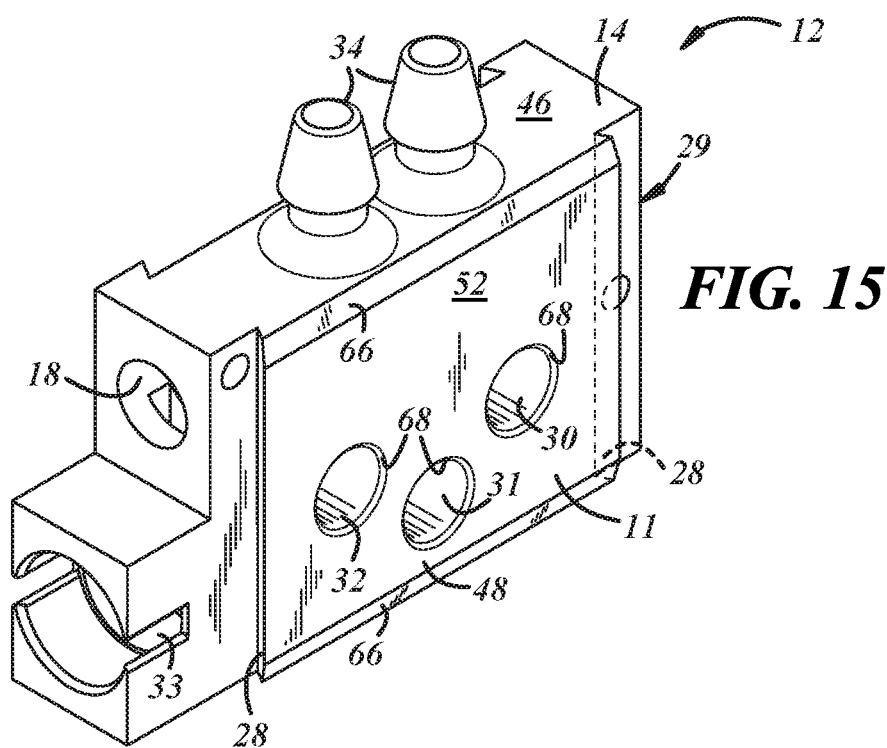
FIG. 15 is a rear perspective view illustrating the other lateral side of the combination manifold housing and valve housing shown in FIG. 14.
Figure 16:
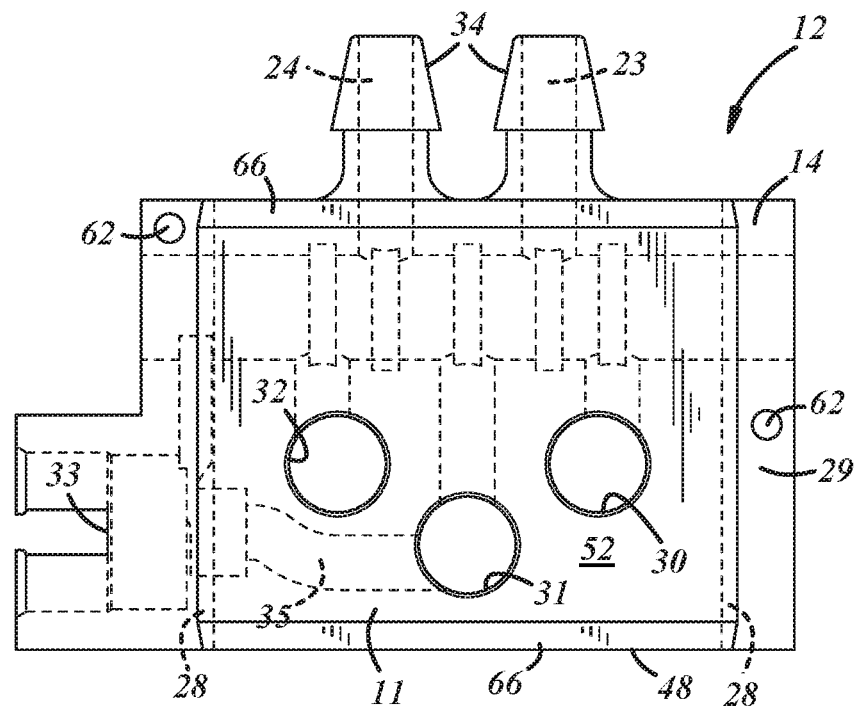
FIG. 16 is a rear elevational view of the combination manifold housing and valve housing shown in FIG. 14.
Figure 17:
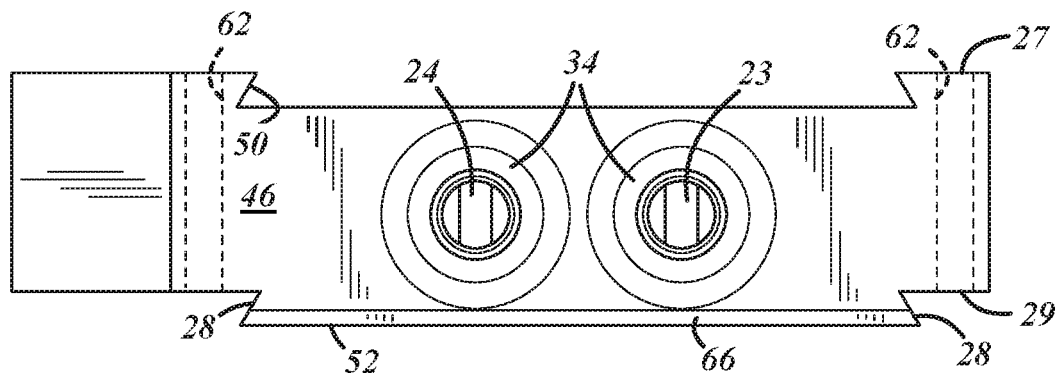
FIG. 17 is a top plan view of the combination manifold housing and valve housing shown in FIG. 14.

As shown in FIGS. 12 and 13, a gasket receiving area 54 surrounds the lateral passages 30, 31 and 32. The gasket 56 is made from commercially available elastomeric material that is suitable for sealing the lateral passages from each other and the ambient exterior and seals between the recess surface 50 and raised section 52 of an adjacent housing.

The grooves 26 and complementary ribs 28 are also tilted inward toward each other from the bottom wall 46 to the top wall 48. The degree of tilt is slight enough to form a self locking connection when wedged together as described below. For example, the tilt of each groove and rib forms an included angle of less than 7° between the two opposing grooves and the two opposite ribs. This included angle is measured along the canted planes of surfaces 50 and 52 as shown by line 60 illustrated in FIG. 12 and not along the vertical line 58, i.e. not along the plane of FIGS. 7 and 9. It has been found that with an included angle of less than 7°, the grooves 26 and ribs 28 can self lock by friction when their surfaces are wedged together.

As shown in FIGS. 12 and 13, assembly of the modular housings 12 to form the manifold bank is simplified without the use of fasteners. One housing 12 as shown in FIGS. 12 and 13 is shown in the partially installed position and is moved downwardly with respect to the other housings 12. The other two housings 12 are shown in a fully installed position. In this partially installed position, it becomes clear that the partially installed housing 12 has its canted recessed wedge surface 50 spaced from the canted raised surface 52 of an adjacent housing 12 to provide clearance to pass by the gasket 56 seated in gasket seating area 54. As the housing 12 is moved downwardly, the recessed surface area 50 moves toward the raised canted surface 52 until it abuts and compresses against the gaskets 56 between the two adjacent housings as shown for the other two fully installed housings 12 to provide a seal. Simultaneously, the ribs 28 and grooves 26 engage each other along their entire surface and are wedged together to provide a self locking tight joint that requires a substantial force to become loosened.

It should be noted that the taper can extend from the top wall 46 to the bottom wall 48 as shown in FIG. 1 if lesser clearance is needed for the gasket 56 about gasket area 54.

It should be understood that the canted raised wedge surface 52, canted recess surface 50, ribs 28, and grooves 26 have further applications than only to a combination housing 12. It can be applied to separate valve section 14 as a separate independent housing 12 like the one illustrated in FIG. 4 or can apply to separate manifold bodies. The interlocking connectors can also apply to mounting solenoid pilot valve spring housings and other individual valve related components.

Another embodiment is shown in FIGS. 14-18. In this embodiment, each housing 12 can be independently removed and installed without disturbing the remaining bank of housings 12. The grooves 26 and complementarily shaped ribs 28 connect two adjacent housings 12 together. Each groove 26 on front lateral side wall 27 faces the other and vertically extends from the bottom wall 48 to the top wall 46. Each rib 28 extends from lateral wall 29 and similarly vertically extends from the bottom wall 48 to the top wall 46.

A vertically oriented recess surface 50 is formed between the two facing grooves ribs 26. The complementarily shaped ribs 28 extend from lateral wall 29. A raised male section 52 of lateral wall 29 is formed between the two spaced ribs 28. The raised male section 52 is also vertically oriented. The bottom and top edges of the raised wall section 52 has an inviting angle section 66 that can be canted backwards at a gentle angle, i.e. less than 45°. A gentle inclination of 15°-20° is foreseen to work. Similar inviting angle section 68 surround port exits 30, 31 and 32 on the male raised section 52. These inviting angle sections 66 and 68 assist in promoting the male section 52 to slide over the gasket 56 so as to not shear the gasket 56.

Each housing 12 has two holes 62 that laterally pass therethrough to receive a respective alignment pin 64. When fully installed the ribs and grooves prevent the housings 14 from tranversely moving relative to each other and the alignment pins 64 prevent the housings 12 from vertically moving with respect to each other as more clearly shown in FIG. 18.

Figure 18:
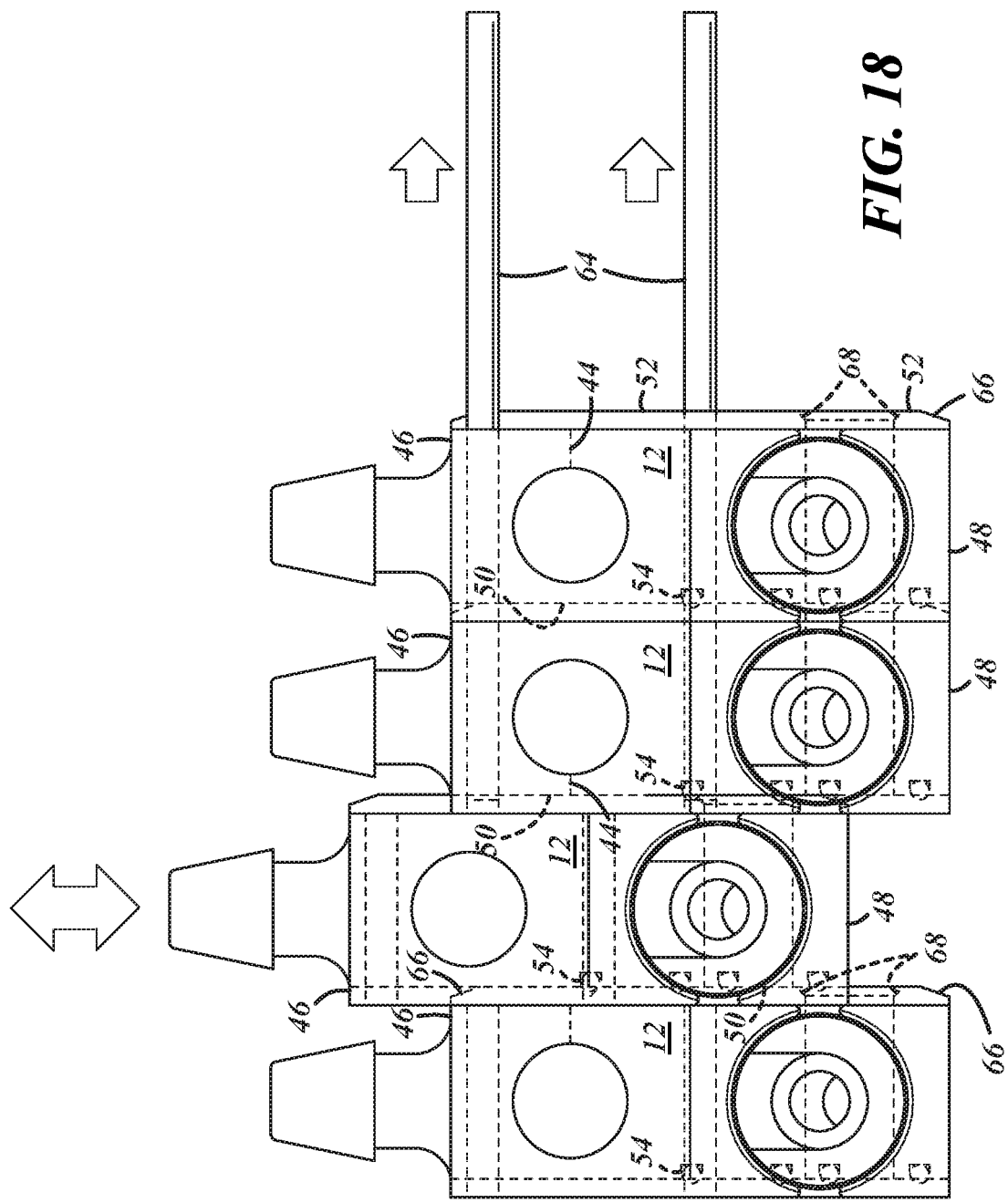
FIG. 18 is a side elevational and schematic view illustrating a bank of combination manifold housings and valve housings in an assembly with one intermediate positioned combination manifold housing and valve housing being partially installed.

As shown in FIG. 18, assembly of the housings 12 to form the manifold bank is simplified without the use of threaded fasteners. One housing 12 is shown in the partially installed position. The housing 12 is moved upwardly or downwardly with respect to the other housings 12. The other housings 12 are shown in a fully installed position. In this partially installed position, it becomes clear that the partially installed housing 12 is merely slid downwardly. The elastomeric gasket 56 slidingly and sealingly abuts against the raised section 52. Once in the vertically correct position, an alignment pin 64 is inserted in each of the holes 62. The housing 12 also has the ability to slide upwardly to the installed position from below.

If a housing 12 needs to be replaced, the alignment pins are merely withdrawn, the manifold housing 12 is pulled up as shown in FIG. 18, removed, and replaced with another. The alignment pins are then reinserted. In this fashion, a single manifold housing 12 can be replaced at any position along the manifold bank without disturbing the remaining housings in the bank.

Many advantages result from the housing 12 being produced by additive manufacturing. The term additive manufacturing, as used herein, is a general industry term defined by ASTM F2792 and refers to all types of processes that build up a component by depositing material as opposed to prior conventional production techniques of removing material. Other synonymous terms, for example, additive fabrication, additive processes, additive techniques, additive layer manufacturing, layer manufacturing, rapid prototyping and freedom fabrication are also commonly used. The additive manufacturing may include, but not limited to 3D printing, stereolithography, selective laser sintering, sintered metal forming, fused deposition modeling and solid ground curing.

Additive manufacturing provides for the integral formation of a combination manifold section and valve section. This integral formation of a combination manifold section and valve section reduces the number of separate ports dramatically. It eliminates the need for fasteners and seals for mounting when a conventional valve housing is mounted to a separate manifold housing. Furthermore, additive manufacturing of the manifold housing can expeditiously form all of the manifold exhaust passages 30 and 32, supply passage 31, internal paths 20, 21 and 22 and ports 23 and 24, valve hole 18, as well as solenoid air supply passage 35 which leads from supply passage to a connector port 33 for the solenoid pilot valve 16 without the use of drilling or boring. Particularly noted are the paths 20, 21 and 22. Which paths, as shown in the figures, are internal and are not economically feasible to drill or otherwise, machine out of the monolithic housing. As such, a monolithic housing was not economically feasible to manufacture with these internal paths with the conventional manufacturing methods. The additive manufacturing also eliminates the need for plugs in access ports that were previously needed to machine the internal paths.

The additive manufacturing also makes a blended metal assembly achievable. For example, 440C stainless steel material can be provided about the valve hole as illustrated by section or layer 41 and the integrally formed remainder of the valve housing and manifold section of the housing 12 can be made from less expensive and/or softer material, e.g. 316L surgical steel or low carbon steel. Alternatively, the remainder may be a harder material, e.g. tungsten. Additive manufacturing eliminates the need for separate slip-in fittings, barbs, and jets because they can all be integrally formed by additive manufacturing as illustrated with fitting 34 formed about ports 23 and 24 shown in FIGS. 6-9 while still being cost effective. The paths 20, 21 and 22 may also have integrally formed fittings.

Additive manufacturing expeditiously can reduce expense and weight by forming supporting webs and ribs with hollow cavities where metal is not required. Thus, less material is used compared to the use of solid bar stock as a starting material.

In this fashion, a monolithic manifold housing made by additive manufacturing has a manifold section and valve housing that is sleeveless and can be mounted to other housings without fasteners. A manifold bank having a plurality of these housings connected together can be simply assembled with a significant reduction in parts.

Other variations and modifications are possible without departing from the scope and spirit of the present invention as defined by the appended claims.

The invention claimed is:

1. A fluid control system that comprises:
    a manifold bank having a plurality of housings fastened to each other side-to-side;
    said plurality of housings including at least two passages therethrough in a manifold section of said plurality of housing parallel to and offset from each other;
    each of said housings having at least one outlet port for selectively being in communication with said at least two passages;
    each of said housings having a valve section being integrally formed therewith and having a valve cavity;
    said valve cavity separate from said at least two passages, and extends transverse from said at least two passages;
    internal paths connected between said valve cavity and said passages;
    a valve spool of each housing slidably mounted in its entirety in said respective valve cavity with no sleeves or seals interposed between said valve spool and said housing for selectively opening said at least one outlet port to one of the at least two passages, and
    an actuator mounted on said housing for slidingly operating said valve spool.

2. A fluid control system as defined in claim 1 further comprising;
    said plurality of housings and said valve spools being made from hardened stainless steel.

3. A fluid control system as defined in claim 2 further comprising;
    said plurality of housing valves and said valve spools being made from 440C stainless steel.

4. A combination modular housing having a valve section and a manifold section integrally formed for a valve manifold bank, said combination modular housing comprising:
    a first lateral side having a first connector;
    a second lateral side having a second connector that is interlockable with a first connector on an adjacent combination modular housing;
    at least one fluid passage extending from said first lateral side to said second lateral side to be alignable with at least one fluid passage of an adjacent combination modular housing; and
    said valve section having a cavity separate and apart from said at least one fluid passage that is sized to receive a valve spool in its entirety therein;
    said cavity extends transverse from said at least one fluid passage;
    at least one valve port in communication with said cavity such that said valve spool can be moved to selectively open or close said at least one valve port with respect to said at least one fluid passage.

5. A combination modular housing as defined in claim 4 further comprising:
said first connector being a set of ribs that extend transverse straight with respect to said at least one fluid passage;
said second connector being a set of grooves that are interlockable with said set of ribs on said adjacent combination modular housing;
said set of grooves extends transverse straight with respect to said at least one fluid passage;
each of said ribs having distal edges facing away from each other and forming a raised lateral surface therebetween; and
each of said grooves having distal edges facing toward each other and forming a recess surface therebetween wherein said recess surface is slidably engageable with a raised lateral surface of said adjacent combination modular housing.

6. A combination modular housing as defined in claim 4 further comprising:
said cavity in said valve housing section being a hole therein for slidably mounting a said valve spool directly therein with no sleeves or seals interposed therebetween.

7. A combination modular housing as defined in claim 6 further comprising:
said valve housing made from 440C stainless steel.

8. A combination modular housing as defined in claim 5 further comprising:
said ribs and grooves being vertically extending to allow said combination modular housing to slidably engage and disengage in a vertical direction from a position within the manifold bank without disturbing other combination modular housings on either side of said combination modular housing and without withdrawal of said valve spool from said combination modular housing; and
said combination modular housing having at least one laterally extending alignment pin hole for receiving an alignment pin for fixing said combination modular housing from vertically moving with respect to said other combination modular housing when said alignment pin (64) extends through said other combination modular housings.

9. A combination modular housing having a valve section and a manifold section integrally formed for a valve manifold bank, said combination modular housing comprising:
a first lateral side having a first connector;
a second lateral side having a second connector that is interlockable with a first connector on an adjacent combination modular housing;
at least one fluid passage extending from said first lateral side to said second lateral side to be alignable with at least one fluid passage of an adjacent combination modular housing;
said valve section having a cavity sized to receive a valve;
said first connector being a set of ribs that extend transverse straight with respect to said at least one fluid passage;
said second connector being a set of grooves that are interlockable with said set of ribs on said adjacent combination modular housing;
said set of grooves extends transverse straight with respect to said at least one fluid passage;
each of said ribs having distal edges facing away from each other and forming a raised lateral surface therebetween; and
each of said grooves having distal edges facing toward each other and forming a recess surface therebetween wherein said recess surface is slidably engageable with a raised lateral surface of said adjacent combination modular housing;
said ribs being angled from each other along a vertical axis; and
said groove being angled from each other along a vertical axis.

10. A combination modular housing as defined in claim 9 further comprising:
said raised lateral surface being canted to form a wedge;
said wedge having its greatest thickness in proximity to or at one of said bottom and top wall of said combination modular housing and tapered to said other of said bottom and top wall of said combination modular housing;
said recess surface being canted to form a wedged shaped cavity;
said wedge shaped cavity having its greatest depth in at one of said bottom and top wall of said combination modular housing and tapered toward the other of said bottom and top wall of said combination modular housing; and
said raised lateral surface of said combination modular housing being slideably engageable to a recess lateral surface of said adjacent combination modular housing for compressing a sealing gasket that is positioned about said fluid passage and interposed between said respective lateral recessed and raised surfaces of said combination modular housing and said adjacent combination modular housing.

11. A combination modular housing as defined in claim 10 further comprising:
each of said ribs being canted inward toward each other at an included angle of less than 7° to form a self locking taper; and
each of said grooves being canted toward each other at a same respective angle of less than 7° to form a self locking taper.

12. A combination modular housing as defined in claim 11 further comprising:
said cavity in said valve section being a hole therein for slidably mounting a valve spool directly therein with no sleeves or seals interposed therebetween.

13. A combination modular housing as defined in claim 12 further comprising:
said combination modular housing made from 440C stainless steel.

14. A combination manifold and valve housing comprising:
a valve section having a valve cavity therein for receiving a valve therein;
a manifold section integrally formed with said valve section;
said manifold section having two exterior facing lateral side walls at opposite sides thereof and including at least one passage that laterally extends between said two exterior facing lateral side walls with ports at each side wall at opposite ends of said at least one passage;
said valve section and said manifold section being made from hardened stainless steel; and said at least one passage in fluid communication with said valve cavity via at least one internal path extending between said valve cavity and said at least one passage.

15. A combination manifold and valve housing as defined in claim 14 further comprising:

said at least one passage being a plurality of passages parallel and offset with respect to each other;

said at least one internal path being a plurality of internal paths;

said cavity being a valve hole that is cylindrically shaped and having a circular shape in cross-section;

said valve hole being substantially perpendicular to said plurality of passages;

said valve being a valve spool slidably installed in the valve hole of the valve housing section;

said plurality of internal paths being transverse to both said valve hole and said plurality of passages;

said valve spool being made from hardened stainless steel;

said valve spool slidably installed entirely within the valve hole of said valve housing section with no sleeves or seals interposed between; and an integrally formed valve fitting surrounding an outlet port extending from said valve hole and an exterior wall of said combination manifold and valve housing.

* * * * *